(12) United States Patent
Divakar et al.

(10) Patent No.: US 12,307,753 B2
(45) Date of Patent: May 20, 2025

(54) METHOD, APPARATUS, AND COMPUTER READABLE MEDIUM

(71) Applicant: RAKUTEN MOBILE, INC., Tokyo (JP)

(72) Inventors: Nithish Divakar, Karnataka (IN); Wrik Bhadra, Karnataka (IN)

(73) Assignee: RAKUTEN MOBILE, INC., Tokyo (JP)

( * ) Notice: Subject to any disclaimer, the term of this patent is extended or adjusted under 35 U.S.C. 154(b) by 688 days.

(21) Appl. No.: 17/645,726

(22) Filed: Dec. 22, 2021

(65) Prior Publication Data

US 2023/0196751 A1 Jun. 22, 2023

(51) Int. Cl.
*G06V 10/82* (2022.01)
*G06T 7/13* (2017.01)
*G06T 11/00* (2006.01)
*G06V 10/50* (2022.01)
*G06V 10/74* (2022.01)
*G06V 10/762* (2022.01)

(52) U.S. Cl.
CPC ............... *G06V 10/82* (2022.01); *G06T 7/13* (2017.01); *G06T 11/00* (2013.01); *G06V 10/50* (2022.01); *G06V 10/761* (2022.01); *G06V 10/762* (2022.01)

(58) Field of Classification Search
CPC ...... G06V 10/82; G06V 10/50; G06V 10/761; G06V 10/762; G06T 7/13; G06T 11/00
See application file for complete search history.

(56) References Cited

U.S. PATENT DOCUMENTS

| | | | | |
|---|---|---|---|---|
| 10,025,950 | B1* | 7/2018 | Avasarala | G06F 18/23213 |
| 2013/0343642 | A1* | 12/2013 | Kuo | G06V 10/56 |
| | | | | 382/159 |
| 2015/0170333 | A1* | 6/2015 | Jing | G06F 16/532 |
| | | | | 345/660 |

\* cited by examiner

*Primary Examiner* — Ayodeji O Ayotunde
(74) *Attorney, Agent, or Firm* — HAUPTMAN HAM, LLP

(57) ABSTRACT

A method includes computing a plurality of histograms from a corresponding plurality of images and, using the plurality of histograms, calculating a matrix of similarity scores between each image of the plurality of images and each other image of the plurality of images. Based on the matrix of similarity scores, a subset of the plurality of images is grouped into an image cluster. An annotation is added to a first image of the image cluster and propagated to additional images of the image cluster, thereby generating a plurality of annotated images. Using the plurality of annotated images, a neural network is trained to identify one or more objects in the images of the plurality of images.

In some embodiments, edge detection is applied to the one or more objects to determine an angle relative to a vertical axis whereby changes in the angle over time are capable of being monitored.

21 Claims, 7 Drawing Sheets

METHOD, APPARATUS, AND COMPUTER READABLE MEDIUM

BACKGROUND

Telecom (e.g., cellular, etc.) and other wireless communication systems rely on multiple antennae used to transmit and receive electromagnetic signals. Reliability of the wireless communication systems is a function of multiple factors that include ensuring that the multiple antennae are capable of providing functional transmission links over time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
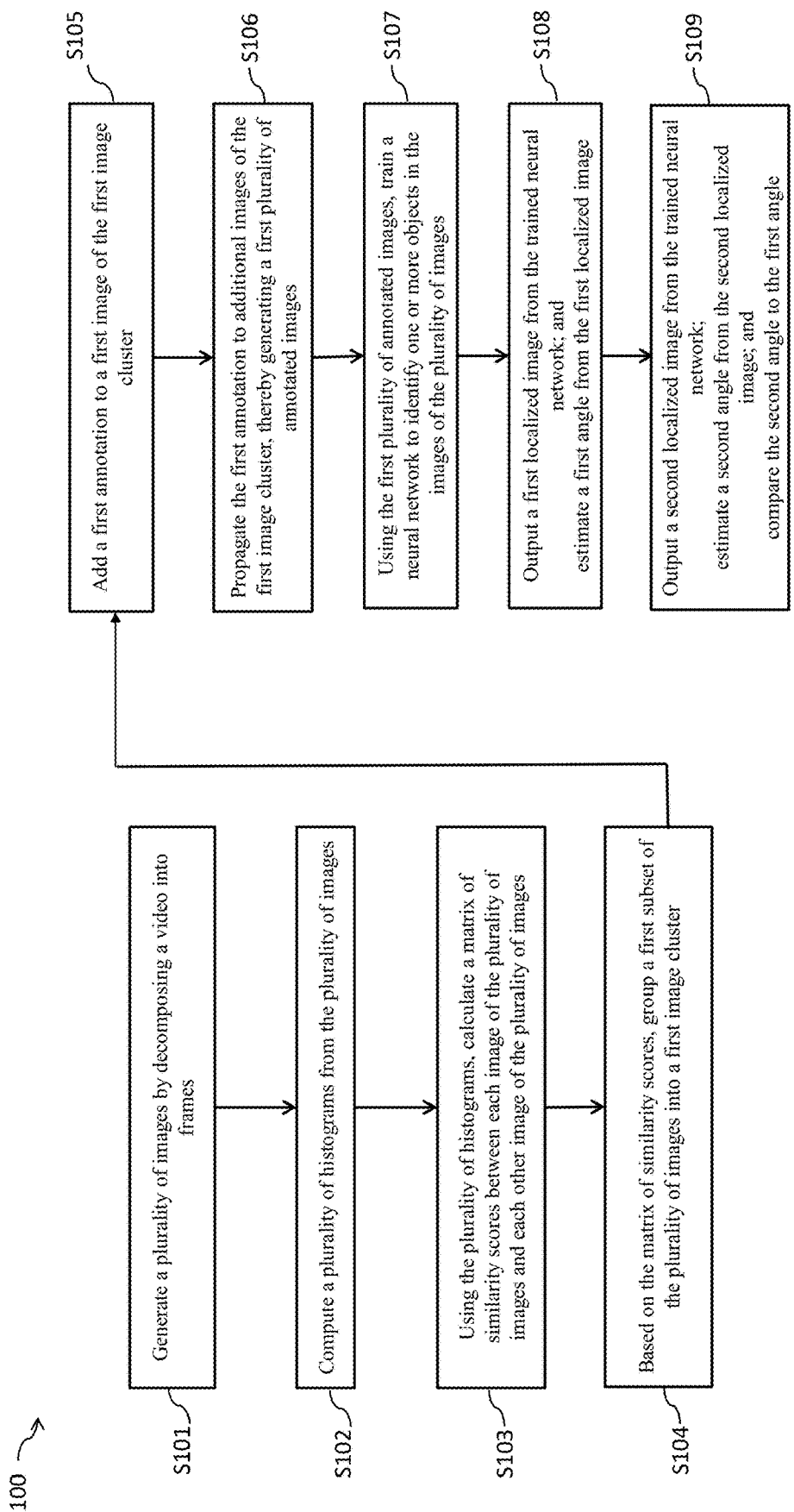
FIG. 1 is a flowchart of a method, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a method, apparatus, and computer readable medium are directed to improving image processing technology by one or both of training a neural network to identify one or more objects or estimating an angle from a localized image output from the trained neural network. In some embodiments, training the neural network includes clustering images using histogram-based similarity scores, then propagating annotations within a cluster, thereby significantly reducing data preparation time compared to other approaches. In some embodiments, estimating the angle from the localized image includes detecting an edge of the one or more objects and calculating an image moment and eigenvector from the edge image, thereby improving efficiency compared to other approaches.

FIG. 1 is a flowchart of a method 100, in accordance with some embodiments. In some embodiments, method 100 is usable to train a neural network to identify one or more objects and estimate an angle from a localized image output from the trained neural network. In some embodiments, as further illustrated in FIGS. 2-4, training the neural network includes clustering images using histogram-based similarity scores, then propagating annotations within a cluster. In some embodiments, as further illustrated in FIGS. 5 and 6, estimating the angle from the localized image includes detecting an edge of the one or more objects and calculating an image moment and eigenvector from the edge image.

One or more operations of method 100 are capable of being performed by one or more systems, e.g., one or more instances of a system 700 discussed below with respect to FIG. 7. It is understood that additional operations may be performed before, during, between, and/or after the operations of method 100 depicted in FIG. 1, and that some other operations may only be briefly described herein. In some embodiments, other orders of the operations of method 100 are within the scope of the present disclosure. In some embodiments, one or more operations of method 100 are not performed.

Method 100 includes exemplary operations, but the operations are not necessarily performed in the order shown. Operations may be added, replaced, changed order, and/or eliminated as appropriate, in accordance with the spirit and scope of disclosed embodiments.

At operation S101, in some embodiments, a plurality of images is generated by decomposing a video into frames. In some embodiments, decomposing the video into frames is referred to as framing.

In some embodiments, generating the plurality of images includes receiving the video from a source, e.g., a fixed camera or a storage device. In some embodiments, receiving the video includes receiving the video through a direct connection or over a network, e.g., the internet. In some embodiments, receiving the video is referred to as receiving raw video footage.

In some embodiments, receiving the video includes receiving multiple videos from a single source. In some embodiments, receiving the video includes receiving one or more videos from multiple sources.

In some embodiments, decomposing the video into frames includes choosing frames from the video at regular intervals, e.g., ranging from every five seconds to every ten seconds. In some embodiments, decomposing the video into frames includes choosing frames from the video at intervals that vary.

Generating the plurality of images includes generating the plurality of images having a number determined by a length of the video and the length(s) of the intervals. As the number of images increases, both the accuracy and amount of time required to perform one or more of the operations of method 100 increase. In some embodiments, generating the plurality of images includes generating the plurality of images having the number ranging from 10,000 to 500,000. In some embodiments, generating the plurality of images includes generating the plurality of images having the number ranging from 50,000 to 750,000.

In some embodiments, the video is one video of a plurality of videos, and generating the plurality of images by decomposing the video into frames includes generating multiple pluralities of images by decomposing each video of the plurality of videos into corresponding frames.

Figure 2:
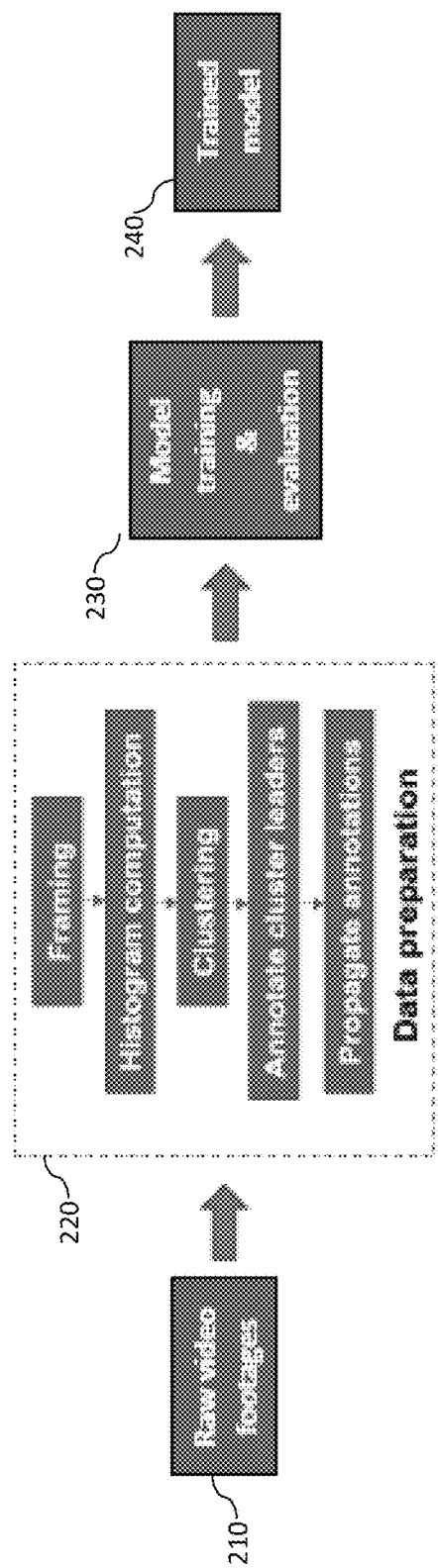
FIG. 2 is a flowchart of a method, in accordance with some embodiments.

FIG. 2 depicts a non-limiting example of a portion of the operations of method 100. In the embodiment depicted in FIG. 2, raw video footages 210 are received by a data preparation module 220. Data preparation module 220 is computer program code, e.g., data preparation 716 discussed below with respect to FIG. 7, configured to cause a system to perform some or all of operations S101-S106 discussed herein. In the embodiment depicted in FIG. 2, operation S101 corresponds to data preparation module 220 performing a framing operation on raw video footages 210.

In some embodiments, operation S101 is not performed and the plurality/pluralities of images is/are received by a system, e.g., system 700 discussed below with respect to FIG. 7.

At operation S102, in some embodiments, a plurality of histograms is computed from the plurality of images. Computing the plurality of histograms includes computing a histogram from each image by determining a tonal distribution of the pixels in the image. Computing the histogram for a given image includes determining numbers of pixels corresponding to ranges of brightness and/or colors, also referred to as channels in some embodiments.

In some embodiments, computing each histogram of the plurality of histograms comprises performing computations for each of a red channel, a green channel, and a blue channel.

In the embodiment depicted in FIG. 2, operation S102 corresponds to data preparation module 220 performing a histogram computation after performing the framing operation in operation S101.

In some embodiments in which the video is one video of a plurality of videos, operation S102 includes computing one or more additional pluralities of histograms from the pluralities of images corresponding to the one or more additional videos of the plurality of videos.

At operation S103, in some embodiments, the plurality of histograms is used to calculate a matrix of similarity scores between each image of the plurality of images and each other image of the plurality of images. In some embodiments, the matrix is referred to as a distance matrix.

Calculating each similarity score of the matrix of similarity scores includes calculating a single number based on the histogram data. In some embodiments, calculating the single number includes calculating a correlation value, e.g., a value ranging from 0 to 1 in which increasing values correspond to increasing similarity.

In some embodiments in which the video is one video of a plurality of videos, operation S103 includes calculating one or more additional matrices of similarity scores based on one or more additional pluralities of histograms corresponding to the one or more additional videos of the plurality of videos.

At operation S104, in some embodiments, a first subset of the plurality of images is grouped into a first image cluster based on the matrix of similarity scores. Grouping the first subset of the plurality of images includes comparing the similarity scores between the images and forming the first image cluster including images corresponding to scores above or below a threshold level, e.g., a similarity score greater than 0.9.

In some embodiments, grouping the first subset of the plurality of images includes grouping one or more additional subsets, e.g., a second subset, of the plurality of images into one or more additional image clusters, e.g., a second image cluster, based on the matrix of similarity scores. In some embodiments, grouping the first subset and the one or more additional subsets includes including a given image of the plurality of images in a maximum of one image cluster.

In some embodiments in which the video is one video of a plurality of videos, operation S104 includes, for each of the one or more additional pluralities of images corresponding to the one or more additional videos of the plurality of videos, grouping at least one subset into at least one image cluster based on the corresponding one or more matrices of similarity scores.

In some embodiments, operation S104 includes generating or updating one or more files and/or creating or updating a database configured to map each image to a corresponding image cluster of a corresponding plurality of images of a corresponding video.

In the embodiment depicted in FIG. 2, operations S103 and S104 correspond to data preparation module 220 performing a clustering operation based on the histogram computation.

Figure 3:
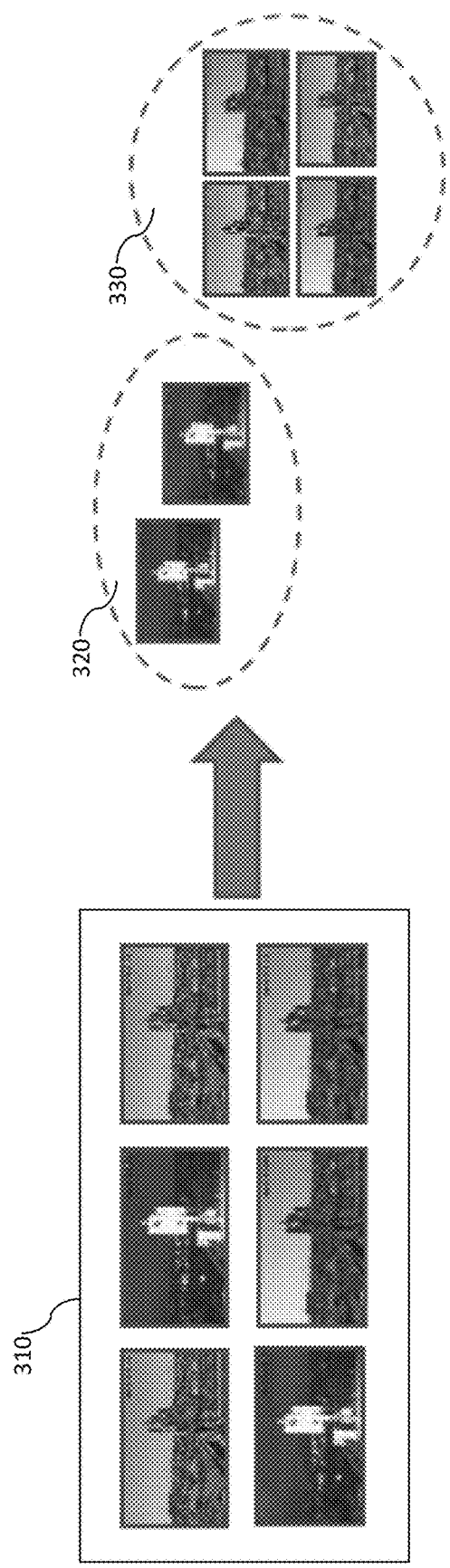
FIG. 3 is an example of image clusters, in accordance with some embodiments.

FIG. 3 depicts a non-limiting example in which operation S104 is performed on a plurality of images 310, thereby grouping two subsets of images into corresponding image clusters 320 and 330 based on a matrix of similarity scores.

At operation S105, in some embodiments, a first annotation is added to a first image of the first image cluster. In some embodiments, adding the first annotation to the first image of the first image cluster includes adding one or more boxes corresponding to one or more objects in the images of the plurality of images.

In some embodiments, adding the first annotation to the first image of the first image cluster is performed manually, and operation S105 includes receiving the first annotation to the first image of the first image cluster, e.g., at system 700 discussed below with respect to FIG. 7. In some embodiments, receiving the first annotation to the first image of the first image cluster includes data preparation module 220 receiving the first annotation to the first image of the first image cluster. In some embodiments, adding the first annotation to the first image of the first image cluster is performed automatically, e.g., by data preparation module 220.

In some embodiments, the one or more objects include a pole and one or more antennae attached to the pole, also referred to collectively as an antenna tower in some embodiments, and adding the first annotation to the first image of the first image cluster includes adding a first box including some or all of the pole and a second box including some or all of an antenna of the one or more antennae.

In some embodiments, adding the first annotation to the first image of the first image cluster includes adding one or more additional annotations to the first image of the first image cluster. In some embodiments, adding the one or more additional annotations to the first image of the first image cluster includes adding a third box including some or all of a second pole and a fourth box including some or all of a second antenna attached to the second pole.

In some embodiments, adding the first annotation to the first image of the first image cluster includes adding one or more additional annotations to one or more first images of one or more additional image clusters of the plurality of images. In some embodiments, adding the first annotation to the first image of the first image cluster includes adding one or more additional annotations to one or more first images of one or more additional image clusters of one or more additional pluralities of images.

In some embodiments, adding the first annotation to the first image of the first image cluster includes selecting the first image from each image cluster, e.g., the first image cluster. In some embodiments, selecting the first image from a given image cluster includes randomly selecting the first image from the given image cluster. In some embodiments, selecting the first image from a given image cluster includes executing an algorithm, e.g., selecting the first image based on the matrix of similarity scores for the given image cluster, e.g., based on a highest similarity score.

In some embodiments, adding the first annotation to the first image of the first image cluster includes receiving user input by a system, e.g., by system 700 discussed below with respect to FIG. 7, the user input including one or more annotations corresponding to one or more image clusters and/or one or more selections of one or more first images of one or more image clusters.

In the embodiment depicted in FIG. 2, operation S105 corresponds to data preparation module 220 annotating the cluster leaders after performing the clustering operation.

Figure 4:
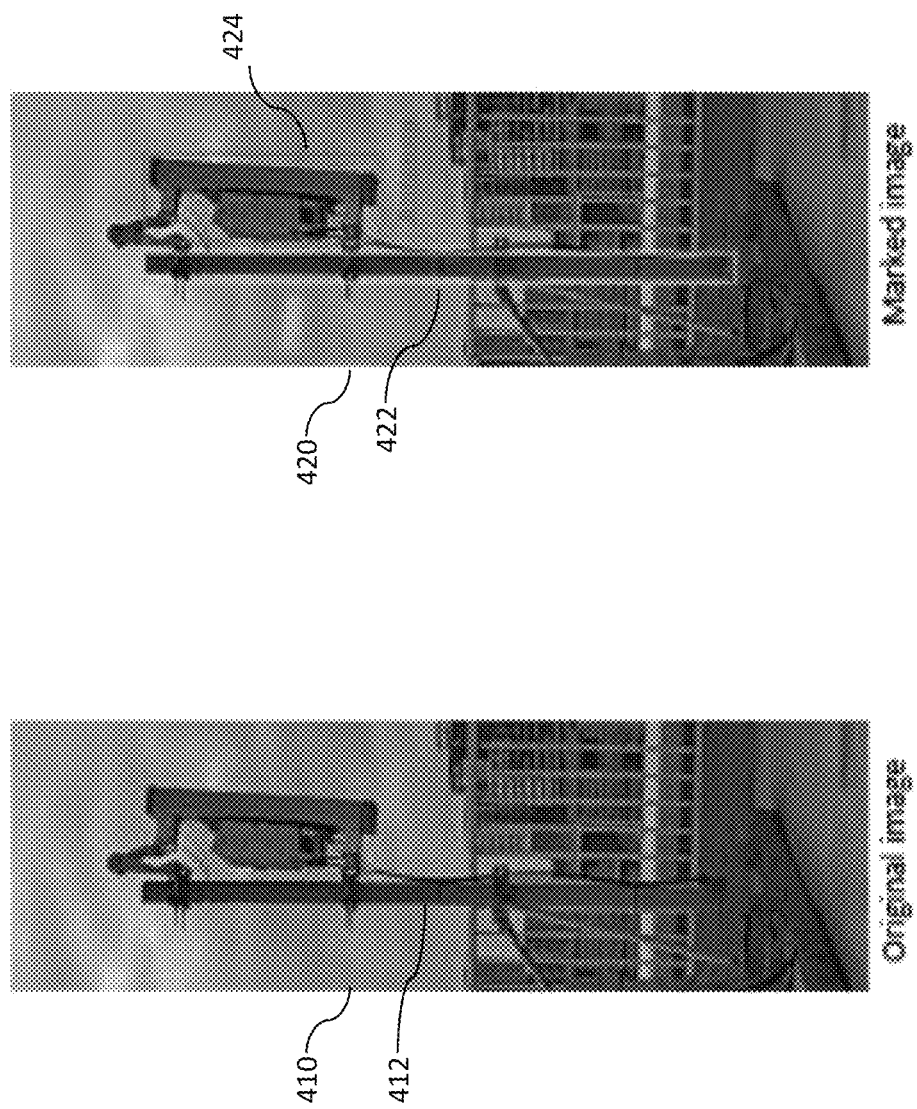
FIG. 4 is an example of an image and an annotated image, in accordance with some embodiments.

FIG. 4 depicts a non-limiting example in which operation S105 is performed on an original image 410 including an antenna tower 412, thereby generating an annotated image referred to as a marked image 420 in which the annotation includes a box 422 including some or all of a pole of antenna tower 412 and a box 424 including some or all of an antenna of antenna tower 412.

At operation S106, in some embodiments, the first annotation is propagated to additional images of the first image cluster, thereby generating a first plurality of annotated images. In some embodiments, propagating the first annotation to additional images of the first image cluster includes propagating the first annotation to each additional image of the first image cluster. In some embodiments, propagating the first annotation to additional images of the first image cluster includes propagating the first annotation to a portion of the additional images of the first image cluster.

In some embodiments, propagating the first annotation to additional images of the first image cluster includes propagating one or more additional annotations to one or more additional images of one or more additional image clusters of the plurality of images. In some embodiments, propagating the first annotation to additional images of the first image cluster includes propagating one or more additional annotations to one or more additional images of one or more additional image clusters of one or more additional pluralities of images.

In the embodiment depicted in FIG. 2, operation S106 corresponds to data preparation module 220 propagating annotations after annotating the cluster leaders.

By propagating the one or more annotations from the one or more first images to one or more image clusters of one or more pluralities of images, a number of the one or more first images represents a small percentage of a total number of annotated images. Accordingly, a data preparation operation based on operations S102-S106 is capable of significant time reduction compared to approaches in which annotations are added to each image of a total number of images.

In some embodiments, the number of the one or more first images compared to the total number of annotated images corresponds to a percentage ranging from 0.01% to 1%. In some embodiments, the number of the one or more first images compared to the total number of annotated images corresponds to a percentage ranging from 0.05% to 0.15%.

At operation S107, in some embodiments, the first plurality of annotated images is used to train a neural network to identify the one or more objects in the images of the plurality of images. In some embodiments, training the neural network includes training a deep learning model. In some embodiments, training the neural network includes training a convolutional neural network (CNN), a feature pyramid network (FPN), or other suitable neural network.

In some embodiments, training the neural network to identify the one or more objects in the images of the plurality of images includes training the neural network to identify the pole and the antenna. In some embodiments, training the neural network to identify the one or more objects in the images of the plurality of images includes training the neural network to identify multiple poles and corresponding antennae.

In some embodiments, using the first plurality of annotated images to train the neural network includes using one or more additional pluralities of annotated images, e.g., corresponding to one or more additional image clusters and/or one or more additional pluralities of images corresponding to one or more additional videos, to train the neural network.

In some embodiments, using the first plurality of annotated images to train the neural network includes modifying the neural network to produce a trained neural network. In some embodiments, using the first plurality of annotated images to train the neural network includes modifying one or more files or databases controlled by the neural network to produce a trained neural network. In some embodiments, the trained neural network is neural network 718 discussed below with respect to FIG. 7.

In the embodiment depicted in FIG. 2, operation S107 corresponds to a model training and evaluation 230 using annotated images from data preparation module 220 to produce a trained model 240.

At operation S108, in some embodiments, a first localized image is output from the trained neural network, and a first angle is estimated from the first localized image. Outputting the first localized image includes outputting the first localized image including the one or more objects. In some embodiments, outputting the first localized image includes outputting the first localized image including the pole and antenna.

In some embodiments, outputting the first localized image includes outputting the first localized image including a first subset of the one or more objects, e.g., the first pole and the first antenna, and outputting one or more additional localized images including one or more additional subsets of the one or more objects, e.g., one or more additional poles and corresponding antennae.

Estimating the first angle includes detecting a first edge of the one or more objects and calculating an image moment and an eigenvector based on the first edge image. Each of detecting the first edge of the one or more objects, calculating the image moment, and calculating the eigenvector includes executing computer program code, e.g., a post-processing module 720 discussed below with respect to FIG. 7, configured to perform the functions discussed below.

Detecting the first edge of the one or more objects includes executing a linear algebra technique, e.g., a Canny edge detection algorithm, in which one or more edge images including optimal threshold values are identified in the localized image. The one or more edge images including optimal threshold values are used to calculate one or more image moments, each including a weighted average of pixel intensities. From a given image moment, an eigenvector having largest eigenvalues is determined, the eigenvector thereby indicating a direction of the corresponding edge image relative to an orientation of the localized image.

The orientation of the localized image corresponds to a straight line having a fixed direction relative to one or more coordinates of the localized image. In some embodiments, the orientation of the localized image corresponds to a vertical axis of the localized image, e.g., based on one or more vertical axes of the first plurality of annotated images.

The first angle is thereby defined as a difference between the direction of the edge image relative to the direction of the straight line that corresponds to the orientation of the localized image. As discussed below, the first angle is capable of being used as a reference angle at a first point in time for comparison with additional angles obtained at later points in time. The additional angles estimated from additional localized images obtained over time thereby provide an indication of changes over time in the direction of the edge images relative to the orientation of the localized image.

In some embodiments, outputting the first localized image from the trained neural network includes outputting the additional localized images from the trained neural network, and estimating the first angle includes estimating the additional angles from the corresponding additional localized images.

In some embodiments, estimating the first angle includes outputting the first angle to a user interface and/or a network, e.g., user interface 728 or network 714 discussed below with respect to FIG. 7.

Figure 5:
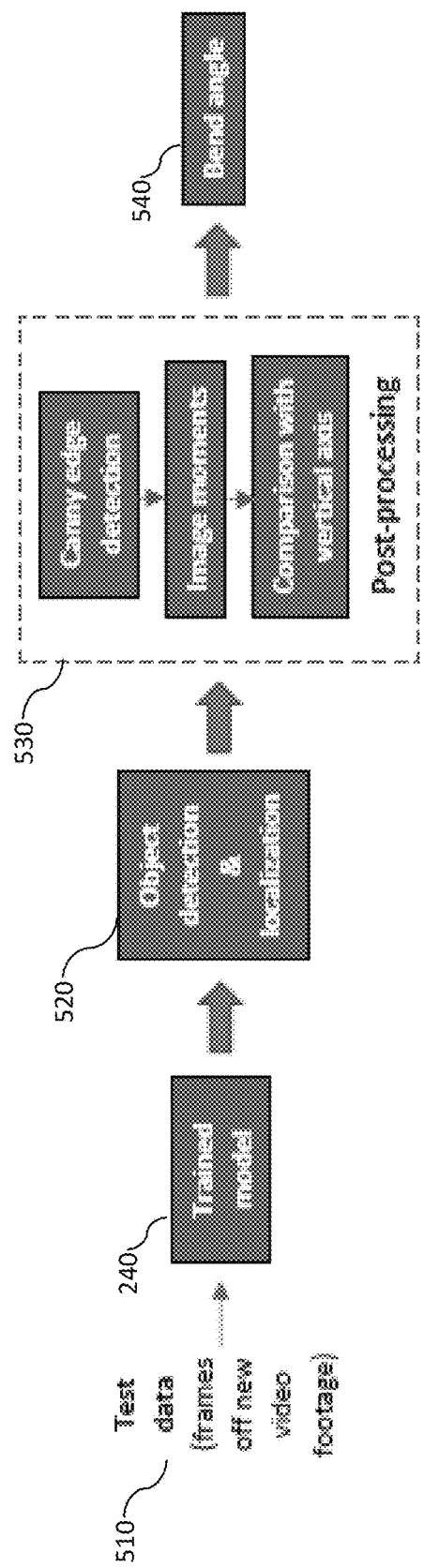
FIG. 5 is a flowchart of a method, in accordance with some embodiments.

FIG. 5 depicts a non-limiting example of a portion of the operations of method 100. In the embodiment depicted in FIG. 5, test data 510 are received by trained model 240, discussed above with respect to FIG. 2, which outputs a localized image in an operation referred to as an object detection and localization 520. A post-processing module 530 receives the localized image and estimates an angle referred to as bend angle 540 based on the localized image. Post-processing module 530 is computer program code, e.g., post-processing 720 discussed below with respect to FIG. 7, configured to cause a system to perform some or all of operations S108 and S109 discussed herein.

In the embodiment depicted in FIG. 5, operation S108 corresponds to post-processing module 530 performing a Canny edge detection, an image moments calculation, and a comparison with vertical axis based on object detection and localization 520 to estimate bend angle 540.

Figure 6:
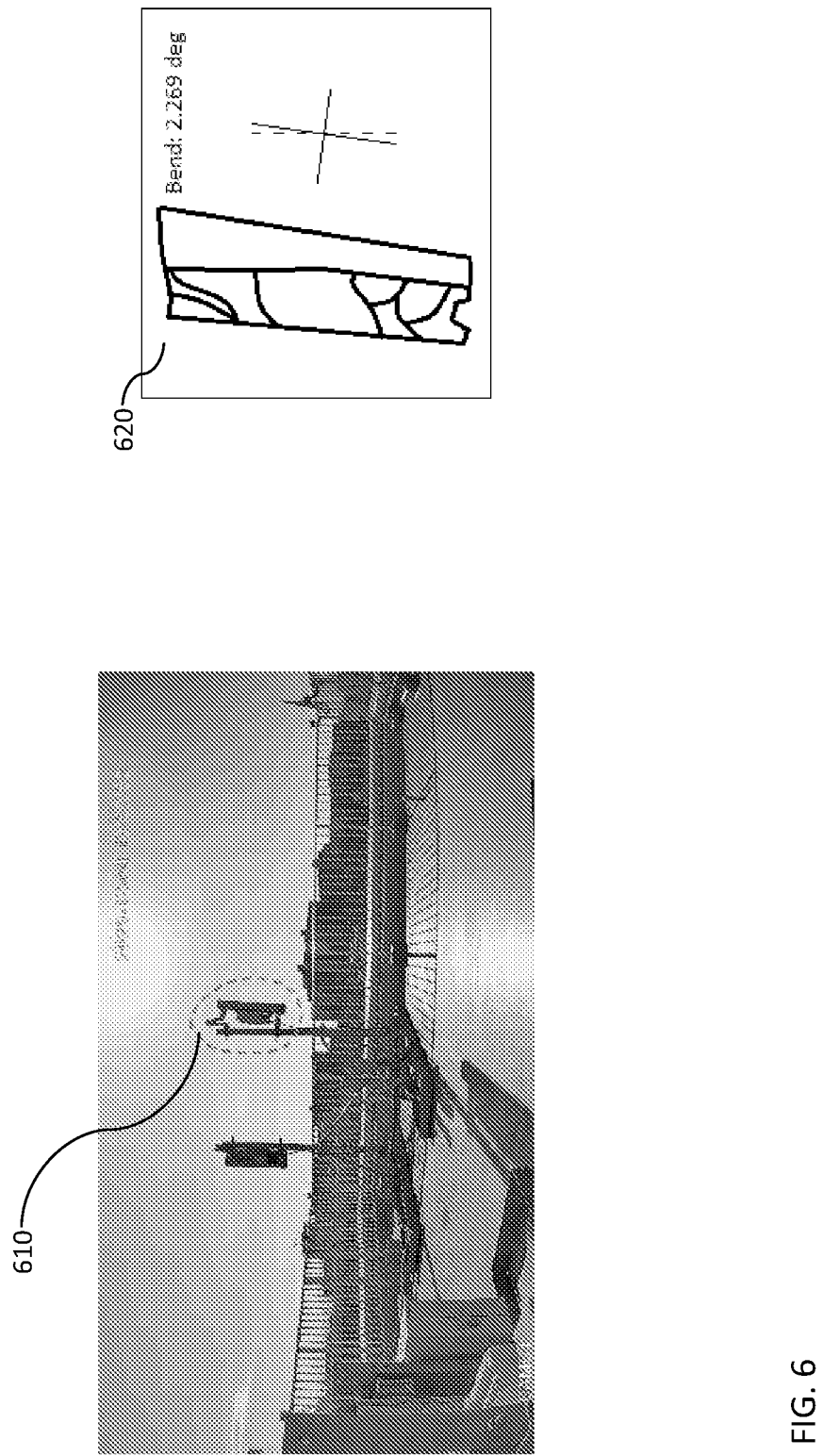
FIG. 6 is an example of an angle estimation, in accordance with some embodiments.

FIG. 6 depicts a non-limiting example in which operation S108 is performed whereby trained model 240 (not shown) generates localized image 610, and post-processing module 530 (not shown) estimates an angle 620 (referred to as Bend: 2.269 deg) relative to a vertical axis of localized image 610.

At operation S109, in some embodiments, a second localized image is output from the trained neural network, a second angle relative to the orientation of the second localized image is estimated from the second localized image, and the second angle is compared to the first angle. The second localized image is based on one or more images corresponding to a video recorded after the recording of the one or more videos from which the one or more pluralities of annotated images were used to train the neural network.

In various embodiments, outputting the second localized image from the trained neural network is performed before, after, or simultaneously with outputting the first localized image in operation S108. In various embodiments, estimating the second angle is performed before, after, or simultaneously with estimating the first angle in operation S108.

In some embodiments, comparing the second angle to the first angle includes determining whether or not a difference between the first and second angles equals or exceeds a threshold. In some embodiments, the one or more objects corresponding to the first and second angles include an antenna tower, and the threshold corresponds to a bending limit of the antenna tower.

In some embodiments, estimating the second angle includes outputting the second angle to a user interface and/or a network, e.g., user interface 728 or network 714 discussed below with respect to FIG. 7. In some embodiments, comparing the second angle to the first angle includes outputting a result of the comparison to the user interface and/or network.

In some embodiments, operation S109 includes repeating one or more of operations S101-S109. In some embodiments, operation S109 includes repeating outputting the second localized image from the trained neural network, estimating the second angle from the second localized image, comparing the second angle to the first angle, and determining whether or not the difference between the first and second angles equals or exceeds the threshold as part of a real-time monitoring operation, e.g., a real-time monitoring operation of one or more antenna towers.

By executing some or all of the operations of method 100, one or both of a neural network is trained to identify one or more objects or an angle is estimated from a localized image output from the trained neural network. In embodiments in which training the neural network includes clustering images using histogram-based similarity scores and propagating annotations within a cluster, data preparation time is significantly reduced compared to other approaches. In embodiments in which estimating the angle from the localized image includes detecting an edge of the one or more objects and calculating an image moment and eigenvector from the edge image, e.g., a real-time monitoring operation, efficiency is improved compared to other approaches.

Figure 7:
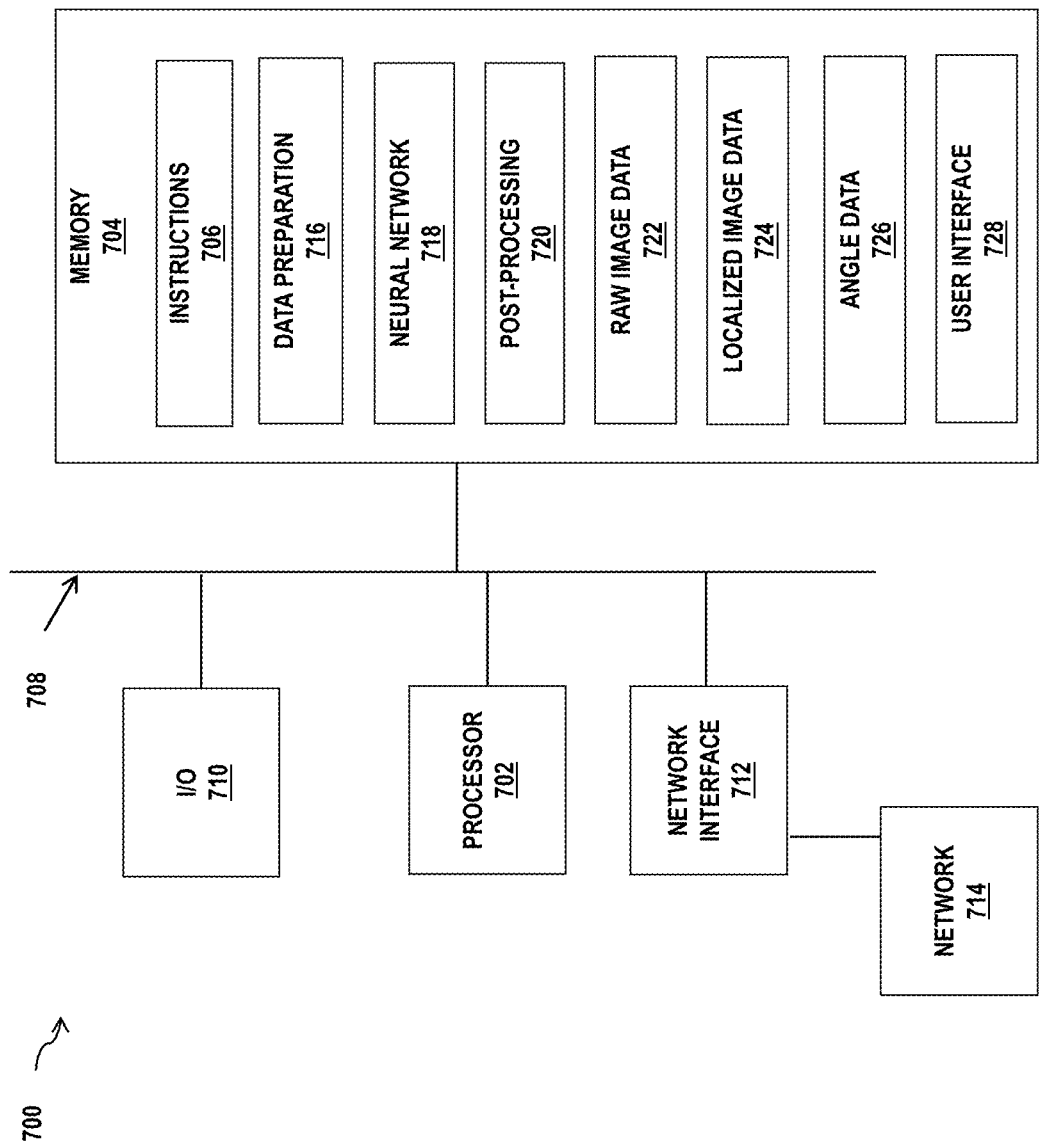
FIG. 7 is a schematic view of a system, in accordance with some embodiments.

FIG. 7 is a schematic view of a system 700, in accordance with some embodiments. System 700 is configured to execute some or all of method 100 discussed above with respect to FIGS. 1-6. In some embodiments, system 700 is an embodiment of one or more instances of a single system 700, each of which includes a subset of the features discussed below, the one or more instances being configured to execute some or all of method 100.

System 700 includes a hardware processor 702 and a non-transitory, computer readable storage medium 704 (e.g., memory 704) encoded with, i.e., storing, the computer program code 706, i.e., a set of executable instructions 706.

Processor 702 is electrically coupled to computer readable storage medium 704 by a bus 708. Processor 702 is also electrically coupled to an I/O interface 710 by bus 708. A network interface 712 is also electrically connected to processor 702 by bus 708. Network interface 712 is connected to a network 714, so that processor 702 and computer readable storage medium 704 are capable of connecting to external elements by network 714. Processor 702 is configured to execute computer program code 706, also referred to as instructions 706 in some embodiments, encoded in computer readable storage medium 704 in order to cause system 700 to be usable for performing a portion or all of the operations as described in method 100. In some embodiments, network 714 is not part of system 700.

In some embodiments, processor 702 is a central processing unit (CPU), a multi-processor, a distributed processing read circuit, an application specific integrated circuit (ASIC), and/or a suitable processing unit.

In some embodiments, computer readable storage medium 704 is an electronic, magnetic, optical, electromagnetic, infrared, and/or a semiconductor read circuit (or apparatus or device). For example, computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, computer readable storage medium 704 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CD-R/W, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, storage medium 704 stores computer program code 706 configured to cause system 700 to perform one or more operations of method 100. In some embodiments, storage medium 704 also stores a set of executable instructions configured to perform one or more operations of method 100, information used for performing method 100 and/or information generated during performing method 100, such as data preparation 716, neural network 718, post-processing 720, raw image data 722, localized image data 724, angle data 726, and/or user interface 728.

In some embodiments, storage medium 704 stores instructions (e.g., computer program code 706) including one or more of data preparation 716, e.g., corresponding to data preparation module 220 discussed above with respect to FIG. 2, neural network 718, or post-processing 720, e.g., corresponding to post-processing module 530 discussed above with respect to FIG. 5. In some embodiments, storage medium 704 stores information including one or more of raw image data, e.g., one or more videos and/or pluralities of images discussed above, localized image data, e.g., one or more localized images discussed above, or angle data, e.g., one or more estimated angles discussed above. In some embodiments, storage medium 704 is thereby configured to effectively implement one or more operations of method 100 during operation of system 700.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer read circuits are connected. Network interface 712 includes wireless network interfaces such as BLUETOOTH, WIFI, WIMAX, GPRS, or WCDMA; or wired network interface such as ETHERNET, USB, or IEEE-884. In some embodiments, method 100 is implemented in two or more systems 700, and the instructions data preparation 716, neural network 718, and/or post-processing 720 and/or information raw image data 722, localized image data 724, and/or angle data 726 are exchanged between different systems 700 by network 714.

System 700 is configured to receive relevant information through I/O interface 710 or network interface 712. In some embodiments, the information is transferred to processor 702 by bus 708, and is then stored in computer readable medium 704 as one or more of data preparation 716, neural network 718, or post-processing 720. In some embodiments, the information is transferred to processor 702 by bus 708, and is then stored in computer readable medium 704 as one or more of raw image data 722, localized image data 724, or angle data 726. In some embodiments, system 700 is configured to receive information related to a user interface through I/O interface 710 or network interface 712, and the information is stored in computer readable medium 704 as user interface 728.

In some embodiments, method 100 is implemented as a standalone software application for execution by a processor. In some embodiments, method 100 is implemented as corresponding software applications for execution by one or more processors. In some embodiments, method 100 is implemented as a software application that is a part of an additional software application. In some embodiments, method 100 is implemented as one or more plug-in to one or more software applications.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method at least partially executed by a processor. In some embodiments, the method includes computing a plurality of histograms from a corresponding plurality of images, using the plurality of histograms, calculating a matrix of similarity scores between each image of the plurality of images and each other image of the plurality of images, based on the matrix of similarity scores, grouping a first subset of the plurality of images into a first image cluster, adding a first annotation to a first image of the first image cluster, propagating the first annotation to additional images of the first image cluster, thereby generating a first plurality of annotated images, and using the first plurality of annotated images, training a neural network to identify one or more objects in the images of the plurality of images.

Another aspect of this description relates to a method. In some embodiments, the method includes generating a plurality of annotated images from a plurality of images, using the plurality of annotated images, training a neural network to identify an antenna tower in the images of the plurality of images, outputting a first localized image of the antenna tower from the trained neural network, estimating a first angle between the antenna tower and a reference axis from the first localized image, outputting a second localized image of the antenna tower from the trained neural network, estimating a second angle between the antenna tower and the reference axis from the second localized image, and comparing the second angle to the first angle.

Still another aspect of this description relates to an apparatus. In some embodiments, the apparatus includes instructions executable by a controller to cause the apparatus to compute a plurality of histograms from a corresponding plurality of images, using the plurality of histograms, calculate a matrix of similarity scores between each image of the plurality of images and each other image of the plurality of images, based on the matrix of similarity scores, group a first subset of the plurality of images into a first image cluster, receive a first annotation to a first image of the first image cluster, propagate the first annotation to additional images of the first image cluster, thereby generating a first plurality of annotated images, using the first plurality of annotated images, train a neural network to identify an object in the images of the plurality of images, output a first localized image of the object from the trained neural network, detect a first direction of a first edge image of the object and estimate a first angle between the first direction of the first edge image and a reference axis from the first localized image, output a second localized image of the object from the trained neural network, detect a second direction of a second edge image of the object and estimate a second angle between the second direction of the second edge image and the reference axis from the second localized image, and compare the second angle to the first angle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
computing a plurality of histograms from a corresponding plurality of images;
using the plurality of histograms, calculating a matrix of similarity scores between each image of the plurality of images and each other image of the plurality of images;
based on the matrix of similarity scores, grouping a first subset of the plurality of images into a first image cluster;
adding a first annotation to a first image of the first image cluster;
propagating the first annotation to additional images of the first image cluster, thereby generating a first plurality of annotated images; and
using the first plurality of annotated images, training a neural network to identify one or more objects in the images of the plurality of images.

2. The method of claim 1, further comprising generating the plurality of images by decomposing a video into frames.

3. The method of claim 1, wherein computing each histogram of the plurality of histograms comprises performing computations for each of a red channel, a green channel, and a blue channel.

4. The method of claim 1, wherein propagating the first annotation to additional images of the first image cluster comprises propagating the first annotation to each additional image of the first image cluster.

5. The method of claim 1, further comprising:
based on the matrix of similarity scores, grouping a second subset of the plurality of images into a second image cluster;
adding a second annotation to a first image of the second image cluster; and
propagating the second annotation to additional images of the second image cluster, thereby generating a second plurality of annotated images,
wherein training the neural network to identify the one or more objects in the images of the plurality of images comprises using the second plurality of annotated images.

6. The method of claim 1, wherein
adding the first annotation to the first image of the first image cluster comprises adding a first box including some or all of a pole and a second box including some or all of an antenna attached to the pole, and
training the neural network to identify the one or more objects in the images of the plurality of images comprises training the neural network to identify the pole and the antenna.

7. The method of claim 6, further comprising:
outputting a localized image of the pole and antenna from the trained neural network; and
estimating, from the localized image, an angle between one or both of the pole or antenna and a reference axis.

8. The method of claim 1, wherein
the plurality of images is a first plurality of images corresponding to frames of a first video,
the plurality of histograms is a first plurality of histograms,
the matrix of similarity scores is a first matrix of similarity scores, and
the method further comprises:
computing a second plurality of histograms from a corresponding second plurality of images corresponding to frames of a second video;
using the second plurality of histograms, calculating a second matrix of similarity scores between each image of the second plurality of images and each other image of the second plurality of images;
based on the second matrix of similarity scores, grouping a second subset of the second plurality of images into a second image cluster;
adding a second annotation to a first image of the second image cluster; and
propagating the second annotation to additional images of the second image cluster, thereby generating a second plurality of annotated images,
wherein training the neural network to identify the one or more objects comprises training the neural network to identify the one or more objects in the frames of the second plurality of images.

9. A method comprising:
generating a plurality of annotated images from a plurality of images;
using the plurality of annotated images, training a neural network to identify an antenna tower in the images of the plurality of images;
outputting a first localized image of the antenna tower from the trained neural network;
estimating a first angle between the antenna tower and a reference axis from the first localized image;

outputting a second localized image of the antenna tower from the trained neural network;
estimating a second angle between the antenna tower and the reference axis from the second localized image; and
comparing the second angle to the first angle.

10. A method comprising:
outputting a first localized image of an object from a trained neural network, wherein the trained neural network is trained, with a plurality of annotated images generated from a plurality of images, to identify the object in images of a plurality of images;
estimating a first angle between the object and a reference axis from the first localized image;
outputting a second localized image of the object from the trained neural network;
estimating a second angle between the object and the reference axis from the second localized image; and
comparing the second angle to the first angle.

11. The method of claim 10, further comprising:
generating the plurality of annotated images from the plurality of images; and
using the plurality of annotated images, training the neural network.

12. The method of claim 11, wherein generating the plurality of annotated images from the plurality of images comprises:
computing a plurality of histograms from the plurality of images;
using the plurality of histograms, calculating a matrix of similarity scores between each image of the plurality of images and each other image of the plurality of images;
based on the matrix of similarity scores, grouping a first subset of the plurality of images into a first image cluster;
adding a first annotation to a first image of the first image cluster; and
propagating the first annotation to additional images of the first image cluster.

13. The method of claim 12, wherein adding the first annotation to the first image of the first image cluster comprises adding a first box including some or all of a first part of the object and a second box including some or all of a second part of the object.

14. The method of claim 10, wherein each of estimating the first angle and estimating the second angle comprises:
detecting an edge image of the object; and
calculating an image moment and an eigenvector based on the edge image.

15. The method of claim 10, wherein comparing the second angle to the first angle comprises determining whether or not a difference between the first and second angles equals or exceeds a threshold.

16. The method of claim 11, wherein
the object is a first object, and
the method further comprises:
training the neural network to identify a second object in the images of the plurality of images;
outputting a third localized image of the second object from the trained neural network;
estimating a third angle between the second object and the reference axis from the third localized image;
outputting a fourth localized image of the second object from the trained neural network;
estimating a fourth angle between the second object and the reference axis from the fourth localized image; and
comparing the fourth angle to the third angle.

17. The method of claim 10, wherein outputting the second localized image of a first part of the object and a second part of the object from the trained neural network, estimating the second angle between the first part and the reference axis from the second localized image, and comparing the second angle to the first angle are repeated as part of a real-time monitoring operation.

18. An apparatus, comprising:
a memory having non-transitory instructions stored; and
a processor coupled to the memory, and being configured to execute the instructions, thereby causing the apparatus to:
output a first localized image of an object from a trained neural network that identifies the object;
detect a first direction of a first edge image of the object and estimate a first angle between the first direction of the first edge image and a reference axis from the first localized image;
output a second localized image of the object from the trained neural network;
detect a second direction of a second edge image of the object and estimate a second angle between the second direction of the second edge image and the reference axis from the second localized image; and
compare the second angle to the first angle.

19. The method of claim 1, further comprising:
outputting a localized image of a first object and a second object from the trained neural network; and
estimating, from the localized image, an angle between one or both of the first object or the second object and a reference axis.

20. The method of claim 1, further comprising:
adding the first annotation to the first image of the first image cluster comprises adding a first box including some or all of a first object and a second box including some or all of a second object attached to the first object, and
training the neural network to identify the one or more objects in the images of the plurality of images comprises training the neural network to identify the first object and the second object.

21. A method comprising:
output a first localized image of an object from a trained neural network that identifies the object;
detect a first direction of a first edge image of the object and estimate a first angle between the first direction of the first edge image and a reference axis from the first localized image;
output a second localized image of the object from the trained neural network;
detect a second direction of a second edge image of the object and estimate a second angle between the second direction of the second edge image and the reference axis from the second localized image; and
compare the second angle to the first angle.

* * * * *